(12) United States Patent
Pan et al.

(10) Patent No.: US 10,503,903 B2
(45) Date of Patent: Dec. 10, 2019

(54) METHOD, SYSTEM, AND DEVICE FOR INFERRING MALICIOUS CODE RULE BASED ON DEEP LEARNING METHOD

(71) Applicant: WUHAN ANTIY INFORMATION TECHNOLOGY CO., LTD., Wuhan, Hubei (CN)

(72) Inventors: Xuanchen Pan, Hubei (CN); Yan Sun, Hubei (CN); Zhiyuan Ma, Hubei (CN)

(73) Assignee: WUHAN ANTIY INFORMATION TECHNOLOGY CO., LTD., Wuhan (CN)

( * ) Notice: Subject to any disclaimer, the term of this patent is extended or adjusted under 35 U.S.C. 154(b) by 116 days.

(21) Appl. No.: 15/572,082

(22) PCT Filed: Nov. 16, 2016

(86) PCT No.: PCT/CN2016/106128
§ 371 (c)(1),
(2) Date: Nov. 6, 2017

(87) PCT Pub. No.: WO2017/084586
PCT Pub. Date: May 26, 2017

(65) Prior Publication Data
US 2018/0096144 A1    Apr. 5, 2018

(30) Foreign Application Priority Data
Nov. 17, 2015 (CN) .......................... 2015 1 0787438

(51) Int. Cl.
*H04L 29/06* (2006.01)
*G06F 21/56* (2013.01)
*G06N 3/08* (2006.01)

(52) U.S. Cl.
CPC ............. *G06F 21/563* (2013.01); *G06N 3/08* (2013.01)

(58) Field of Classification Search
None
See application file for complete search history.

(56) References Cited

U.S. PATENT DOCUMENTS 6,161,130 A * 12/2000 Horvitz ................ G06K 9/6269
  709/206
10,397,272 B1 * 8/2019 Bruss ................. G06K 9/00442
(Continued)

FOREIGN PATENT DOCUMENTS

CN    102411687 A    4/2012
CN    102737186 A    10/2012
(Continued)

OTHER PUBLICATIONS

International Search Report of the International Searching Authority issued in PCT/CN2016/106128 dated Feb. 23, 2017 (10 pages).
(Continued)

*Primary Examiner* — Taghi T Arani
*Assistant Examiner* — Lin Chang
(74) *Attorney, Agent, or Firm* — Osha Liang LLP (57) ABSTRACT

A method, a system and a terminal device for inferring a malicious code rule based on a deep learning method. The method comprises: performing twice training on a known malicious code character string by utilizing a deep learning method based on a word2vec thought, thus obtaining a character string having maximum correlation with the malicious code character string, and further obtaining a character string rule of a malicious code. The method infers a malicious code rule having a low false alarm rate and a high coverage rate by fully utilizing the feature of a malicious sample, thereby optimizing an existing virus detection engine, and increasing detection efficiency of a malicious code.

15 Claims, 3 Drawing Sheets

(56) References Cited

U.S. PATENT DOCUMENTS

| | | | | |
|---|---|---|---|---|
| 2009/0064328 | A1* | 3/2009 | Ahn | G06F 21/564 |
| | | | | 726/22 |
| 2010/0325109 | A1* | 12/2010 | Bai | G06F 16/951 |
| | | | | 707/737 |
| 2012/0159625 | A1 | 6/2012 | Jeong et al. | |
| 2012/0288207 | A1* | 11/2012 | Sun | G06F 16/353 |
| | | | | 382/224 |
| 2013/0347116 | A1* | 12/2013 | Flores | H04L 63/1433 |
| | | | | 726/25 |
| 2014/0058539 | A1* | 2/2014 | Park | G05B 15/02 |
| | | | | 700/50 |
| 2015/0254555 | A1* | 9/2015 | Williams, Jr. | G06N 3/0454 |
| | | | | 706/14 |
| 2015/0332673 | A1* | 11/2015 | Li | G06F 17/276 |
| | | | | 704/235 |
| 2016/0352778 | A1* | 12/2016 | Chari | H04L 63/20 |
| 2017/0118336 | A1* | 4/2017 | Tapuhi | H04M 3/4938 |

FOREIGN PATENT DOCUMENTS

| | | |
|---|---|---|
| CN | 103473506 A | 12/2013 |
| CN | 104123500 A | 10/2014 |
| CN | 104486461 A | 4/2015 |
| CN | 105975857 A | 9/2016 |

OTHER PUBLICATIONS

Written Opinion of the International Searching Authority issued in PCT/CN2016/106128 dated Feb. 23, 2017 (5 pages).

\* cited by examiner

Fig. 1

```
http://127.0.0.1:8787
http://52.71.240.169/api/pxkj
http://52.71.240.169/api/iexs
http://52.71.240.169/api/mksw
http://52.71.240.168/api/omes
http://schemas.android.com/apk/res/android
http://xmlpull.org/v1/doc/features.html#indent-output
httpCode
https://myhosts.sinaapp.com/
blacklist.txtvirtual.android.intent.action.PACKAGE_ADDED
virtual.android.intent.action.PACKAGE_CHANGED
virtual.android.intent.action.PACKAGE_REMOVED
abc_btn_default_mtrl_shape
abc_btn_radio_material
abc_btn_radio_to_on_mtrl_000
com. sams. listviewdemo
ListViewDemo
```

METHOD, SYSTEM, AND DEVICE FOR INFERRING MALICIOUS CODE RULE BASED ON DEEP LEARNING METHOD

CROSS REFERENCE TO RELATED APPLICATION

This application is based upon and claims a priority to Chinese Patent Application Serial No. 201510787438.3, filed with the State Intellectual Property Office of P. R. China on Nov. 17, 2015, titled "Method and System for Inferring Malicious Code Rule based on Deep Learning Method", filed by Wuhan Antiy Information Technology CO., LTD., the entire contents of which are incorporated herein by reference.

TECHNICAL FIELD

The present disclosure relates to the field of mobile network security technology, and more particularly, to a method and a system for inferring a malicious code rule based on a deep learning method.

BACKGROUND

In recent years, with a popularity of an Android system, attacks to an Android platform are increasing. In a third quarter of 2016, in China, newly increased number of malicious software packages intercepted by a majority of ROM security scan software based on AVLSDK services of Wuhan Antiy Information Technology CO., LTD exceeds 100 thousand every day. The number of malicious software packages attacking the Android platform accounts for 92% of the total and increases gradually. Therefore, the Android system faces serious security risks. Furthermore, a security study on smart phones has become a hotspot of the security studies around global. M. Miettinen and P. Halonen made a detailed analysis on the security threats confronted by mobile smart devices and main challenges and weaknesses in a security detection of the smart devices. Abhijit Bose etc. proposed a new detection model for detecting exceptions of smart phones. A difference between the study by Abhijit Bose and that by M. Miettinen and P. Halonen is that, an application running in a smart phone is taken as a target for detecting the exceptions of the smart phone in the new detection model. Behavior patterns of applications installed on the smart phone are described by a temporal logic based on causal relationships, and a SVM machine learning method is used to detect the exceptions. It may be seen that, existing security studies on the smart phone are focused on common exception detections based on behavior patterns. For a certain smart phone platform, such as the Android platform, the behavior patterns of malicious software (also called as malicious code rules) of the certain smart phone platform have not been studied and concluded.

It may be understood that, based on massive newly-added samples, it is important to fully solve a sieving problem. From a perspective of practice experiences, it is generally to solve the sieving problem by a reliable local virus detection engine (engine for short hereafter). That is, the engine filters known rules and samples to detect known malicious samples. Other samples difficult to be judged by the engine are thus detected via a machine learning method or a manual analysis again. In a long term, the existing method for detecting samples is less efficient. Therefore, for those malicious samples difficult to be judged, they should be analyzed in scientific and suitable technical means to infer the malicious code rules for optimizing the existing engine. It may be understood that, the more malicious code rules included in the engine, the higher detection efficiency obtained. Furthermore, well-defined malicious code rules used to optimize an existing engine are desired to satisfy both conditions: (1) a low false alarm rate (i.e., the rules extracted should not be too wide), (2) a high coverage rate (i.e., the rules extracted should completely cover suspected samples).

SUMMARY

To solve above technical problems, a method and a system for inferring a malicious code rule based on a deep learning method are provided in embodiments of the present disclosure. The method and the system may fully utilize features of malicious samples to infer the malicious code rule having a low false alarm rate and a high coverage rate. Therefore, an existing virus detection engine is optimized and an efficiency of malicious codes detection is increased.

Embodiments of the present disclosure provide a method for inferring a malicious code rule based on a deep learning method. The method includes: parsing a dex file carrying malicious codes into character stings, and extracting key character stings from the character strings according to a preset rule; training the key character strings using a word2vec principle to obtain a first trained result; constructing malicious sample feature vectors according to the first trained result; extracting character strings in a preset range from the key character strings according to the malicious sample feature vectors, and training the character strings in the preset range using the word2vec principle again to obtain a second trained result; and acquiring a character string rule of malicious codes according to the second trained result.

Further, training the key character strings using a word2vec principle includes: for each key character string, extracting features of the key character string, and inferring character strings having a close relevance with the key character string according to the features, in which the character strings having a close relevance with the key character string are interpretative character strings for interpreting the key character string.

Further, extracting key character strings from the character strings according to a preset rule includes: selecting a reference sample, and calculating a distance between a character string of the reference sample and a corresponding character string of the dex file carrying malicious codes; and extracting the key character strings from the character strings of the dex file carrying the malicious codes according to the distances and a preset distance threshold.

Further, the key character strings comprise a function invoking relation and a content of code structure context for describing relations of content character strings of the dex file.

Further, constructing malicious sample feature vectors includes: obtaining n sample attribution data based on sample attribution data, calculating vectors of the n sample attribution data based on the n sample attribution data, calculating a similarity matrix of the two vectors of the attribution data, keeping main vectors, and adding up respective dimension components of the main vectors.

Further, keeping main vectors and adding up respective dimension components of the main vectors includes: when a difference between similarity matrixes of the two vectors is greater than a preset threshold, keeping the two vectors; and determining the vectors kept as the malicious sample feature vectors, wherein with respect to the vectors kept, the respective dimension components of the same attribution data are added up.

Further, acquiring a character string rule of malicious codes according to the second trained result includes: acquiring character strings having close correlations to each of the key character strings, finding character string features between the character strings having close correlations to each of the key character strings, and acquiring the malicious code rule according to the character string features.

Further, the method includes extracting the character string features by using a document title generating model LDA to acquire the character string rule of malicious codes.

The system for inferring a malicious code rule based on a deep learning method includes: a parsing module, configured to parse a dex file carrying malicious codes into character stings, and extract key character stings from the character strings according to a preset rule; a training module, configured to train the key character strings using a word2vec principle to obtain a first trained result; a constructing module, configured to construct malicious sample feature vectors according to the first trained result; a re-training module, configured to extract character strings in a preset range from the key character strings according to the malicious sample feature vectors, and to train the character strings in the preset range using the word2vec principle again to obtain a second trained result; and an acquiring module, configured to acquire a character string rule of malicious codes according to the second trained result.

Further, the training module is configured to: for each key character string, extract features of the key character string, and infer character strings having a close relevance with the key character string according to the features, in which the character strings having a close relevance with the key character string are interpretative character strings for interpreting the key character string.

Further, the parsing module is configured to: select a reference sample by using a Monte Carlo method, and calculate an Euclidean distance between a character string of the reference sample and a corresponding character string of the dex file carrying malicious codes; and extract the key character strings from the character strings of the dex file carrying the malicious codes according to the Euclidean distances and a preset Euclidean distance threshold.

Further, the constructing module is configured to obtain n sample attribution data based on sample attribution data, to calculate vectors of the n sample attribution data based on the n sample attribution data, to calculate a similarity matrix of the two vectors of the attribution data, to keep main vectors, and to add up respective dimension components of the main vectors.

Further, the constructing module is configured to keep the two vectors when a difference between similarity matrixes of the two vectors is greater than a preset threshold; and to determine the vectors kept as the malicious sample feature vectors, wherein respect to the vectors kept, the respective dimension components of the same attribution data are added up.

Further, the acquiring module is configured to acquire character strings having close relevance with the key character strings, to find character string features between the character strings having close relevance with the key character strings, and to acquire the character string rule of malicious codes according to the character string features.

Further, the acquiring module is configured to extract the character string features by using a document title generating model LDA to acquire the character string rule of malicious codes.

Embodiments of the present disclosure provide a terminal device. The terminal device includes one or more processors, a memory, and one or more programs. The one or more programs are stored in the memory. When the one or more programs are executed by the one or more processors, the one or more processors are configured to: parse a dex file carrying malicious codes into character stings, and extract key character stings from the character strings according to a preset rule; train the key character strings using a word2vec principle to obtain a first trained result; construct malicious sample feature vectors according to the first trained result; extract character strings in a preset range from the key character strings according to the malicious sample feature vectors, and to train the character strings in the preset range using the word2vec principle again to obtain a second trained result; and acquire a character string rule of malicious codes according to the second trained result.

Embodiments of the present disclosure provide a storage medium. The storage medium is configured to store application programs. The application programs are configured to execute the method for inferring a malicious rule based on a deep learning method described in above embodiments of the present disclosure.

A word2vec principle is inventively applied to a field of malicious code analysis in embodiments of the present disclosure. By training a known character string carrying malicious codes, the character strings having close relevance with the character string carrying the malicious codes are acquired, such that the string rule of the malicious codes is obtained. With the method and the system according to embodiments of the present disclosure, by fully utilizing features of malicious samples, the malicious code rule having a low false alarm rate and a high coverage rate may be inferred, thereby optimizing an existing virus detection engine and increasing an efficiency of malicious codes detection. Furthermore, the method and the system of the present disclosure may be applied to a field of malicious code detection and analysis.

BRIEF DESCRIPTION OF THE DRAWINGS

The drawings used in embodiments of the present disclosure are described simply herein in order to make technical solutions of the present disclosure more apparently. It is obviously that, the drawings are merely embodiments of the present disclosure, and other drawings may be obtained according to the drawings without inventive labors for those skilled in the art.

DETAILED DESCRIPTION

Embodiments of the present disclosure provide a method and a system for inferring a malicious code rule based on a deep learning method. Generally, the deep learning method originates from image recognition, and a text feature extraction method based on context starts to achieve some results in recent years. A conventional text feature extraction method is based on N-gram algorithm model. However, a problem caused by the N-gram algorithm model is that, if some n-tuples in a training corpus do not occur before, conditional probabilities corresponding to these n-tuples are zero. As a result, the probability of a whole sentence is computed as zero. It is thus impossible to train a high-level language model with insufficient corpuses. Furthermore, it is unable to construct similarities between words using the N-gram algorithm model.

A neural network mode has attracted more attentions. For example, the language model based on the neural network mode has a good performance. However, a practice application is susceptible to be affected by a long time taken for performing a training and prediction.

Therefore, in order to overcome above disadvantages, a deep learning text method represented by a word2vec principle may be used. For example, a text feature extraction model based on word2vec may be used. However, a conventional word2vec usually segments an article into words and then performs a context relation training, which cannot be directly applied to a field of malicious code analysis. Therefore, an inventive study is developed in the present disclosure.

For better understanding technical solutions of embodiments of the present disclosure by those skilled in the art, and for making objectives, features and advantages of embodiments of the present disclosure apparently, detailed descriptions to the technical solutions of embodiments of the present disclosure are made with reference to drawings.

Figure 1:
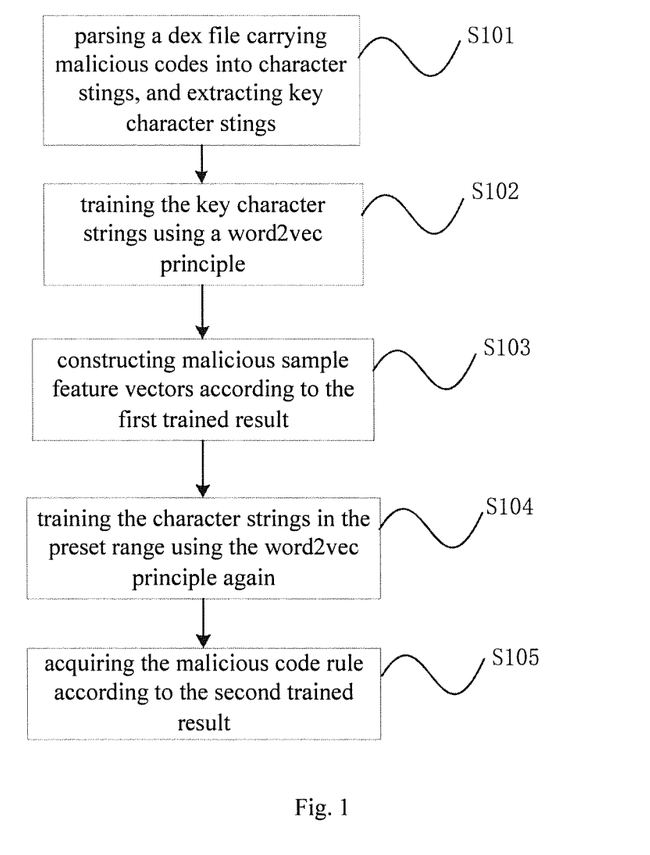
FIG. 1 is a flow chart illustrating a method for inferring a malicious code rule based on a deep learning method provided in embodiments of the present disclosure.

Embodiments of the present disclosure firstly provide a method for inferring a malicious code rule based on a deep learning method. As illustrated in FIG. 1, the method includes followings.

At block S101, a dex file carrying malicious codes are parsed into character strings, and key character strings are extracted from the character strings according to a preset rule. The preset rule may be determined according to actual demands. For example, the preset rule may include: a URL address, codes with a function of skipping or invoking, a package name, a class name and the like.

In an embodiment, a function invoking relation, a code structure context and other contents describing relations of content character strings of the dex file may be extracted from the dex file carrying the malicious codes as the key character strings. Further, a number of reference samples (also called as white samples, i.e., normal samples without malicious codes issued officially) corresponding to the dex file carrying the malicious codes are selected. Furthermore, the reference samples corresponding to malicious sample (e.g., sample whose rule is to be extracted) are selected by employing a principle of Monte Carlo method (also called as statistical simulation method). Multi Groups each having same number of reference samples are calculated for use in following acts.

Figure 2:
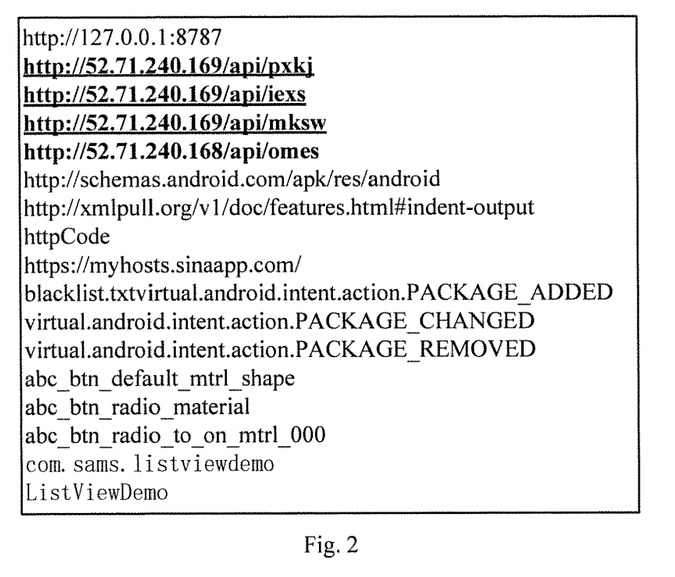
FIG. 2 is an exemplary diagram illustrating a dex file carrying malicious codes provided in embodiments of the present disclosure.

For example, the preset rule including the URL address, the package name and the class name is taken as an example. A dex file with the malicious codes is illustrated in FIG. 2. The dex file may be parsed into the character strings. Character strings including the URL address, the package name or the class name are extracted respectively from the character strings parsed from the dex file according to the preset rule. The character strings including the URL address, the package name or the class name are determined as the key character strings. The extracted key character strings may be followings.

http://127.0.0.1:8787 (internal access ip, a port)
http://52.71.240.169/api/pxkj (external access ip)
http://schemas.android.com/apk/res/android (external access url)
http://xmlpull.org/v1/doc/features.html#indent-output (external access url)
com.sams.listviewdemo (package name)
ListViewDemo (class name)

At block S102, the key character strings are trained using a word2vec principle to obtain a first trained result.

For example, the key character strings extracted from the dex file carrying the malicious codes may be trained by using a deep learning method represented by the word2vec principle to obtain the trained result of the dex file carrying the malicious codes. Furthermore, the reference samples obtained in block S101 are trained similarly using the word2vec principle to obtain a plurality of trained results of the reference samples.

The trained results acquired by using the word2vec principle are described simply below. It may be understood that, each trained result may include interpretative character strings with respect to the key character strings (i.e. the character strings used to interpret the key character strings). The interpretative character strings are character strings having close relevance with the key character strings. For example, if a key character string is "Meng Fei" (a name), the key character string "Meng Fei" may be trained by using the word2vec principle, thereby obtaining the interpretative character strings for interpreting the key character string "Meng Fei". Therefore, the interpretative character strings having close relevance with the key character string "Meng Fei" may be: IF YOU ARE THE ONE (a TV program), Le Jia (a name), Huang Lei (a name) . . . Huang Han (a name) and so on. The interpretative character strings are ranked in a descending order of weight so as to obtain the ranked character strings having close relevance with "Meng Fei" represented by a vector of {Le Jia, IF YOU ARE THE ONE, Huang Lei, Huang Han . . . }.

In other words, based on the word2vec principle, a feature extraction is performed on the key character string "Meng Fei" to extract features of the key character string. If features of the key character string "Meng Fei" are "a host", "a program hosted", "a guest invited in the program hosted", the character strings having close relevance with the key character string "Meng Fei" are inferred based on these features and are ranked according to the relevance from closet to farthest. A vector is used to represent the ranked character strings having close relevance with the key character string, thereby achieving representing the key character string "Meng Fei" by a set of character strings having close relevance with "Meng Fei". That is, the key character string is represented in a form of vector based on the word2vec principle.

It should be noted that, embodiments of the present disclosure take the key character string "Meng Fei" as an example for those skilled in the art to understand the present disclosure, which is not construed to limit the present disclosure.

Similarly, for example, the dex file carrying the malicious codes illustrated in FIG. 2 is taken as an example for illustrative purposes. Assume that the key character string extracted from the dex file is "http://52.71.240.169/api/pxki (external access ip)", the vector of the key character string is shown as follows after the key character string is trained based on the word2vec principle.

```
{52.71.240.169,
http://52.71.240.169/api,
http://52.71.240.169/api/iexs,
http://52.71.240.169/api/mksw,
http://52.71.240.168/api/omes,
...
}
```

At block S103, malicious sample feature vectors are constructed according to the first trained result.

It may be understood that, with the above blocks S101 and S102, the dex file carrying the malicious codes may be parsed into the character strings (the function invoking relation and the code structure context are kept), and the reference samples (also called as white samples) are selected by using the Monte Carlo Method to compare with the malicious sample (i.e. the dex file carrying the malicious codes). The key character strings are selected and extracted according to a preset Euclidean distance threshold for comparison. Above is the first training and feature extraction.

Based on sample attribution data, n sample attribution data are obtained. Based on the n sample attribution data, vectors of the attribution data are calculated. For each vector of the attribution, a similarity matrix of the character is calculated. Main vectors are kept and respective dimension components of all the main vectors are added up. The sample attribution data include malicious sample attribution data and reference sample attribution data. The sample attribution data with malicious codes refer to the key character strings extracted from the dex file carrying the malicious codes. The reference sample attribution data refer to the key character strings extracted from legal files.

As an example, the reference sample attribution data may be acquired by followings. The officially-issued dex files corresponding to the dex file carrying the malicious codes are acquired. The officially-issued dex files can be considered as the legal files. The legal files are parsed into character strings. The key character strings are extracted from the character strings parsed from the officially-issued dex files according to the preset rule. The key character strings of the legal files are determined as the reference sample attribution data.

For example, if n equals to 10, 10 reference sample attribution data and 10 malicious sample attribution data are obtained. On the basis of the 10 reference sample attribution data and 10 malicious sample attribution data, the similarity matrix including similarities between each two vectors of the attribution data in the 10 reference samples is calculated and the similarity matrix including similarities of each two vectors of the attribution data in 10 malicious samples is calculated. For the same attribution data, a difference between the similarity matrix for the vectors of the attribution data in the reference sample and the similarity matrix for the vectors of the attribution data in the malicious sample is acquired. The vectors of the attribution data having a greater difference (for example, greater than a preset threshold) are kept. Then, with respect to these kept vectors of the attribution data, respective dimension components of the vectors for the same attribution data are summed. Finally, the vectors of the attribution data having a greater difference are used as the malicious sample feature vectors.

As an example, the malicious sample attribution data are compared to the reference sample attribution data to obtain difference results. According to the difference results, n important words are extracted from the malicious sample attribution data. The feature extraction is performed on the n important words to acquire character strings (i.e., susceptible character strings) in a preset range, the specific implementation of which is as follows. If a certain character string exists both in a set of malicious samples and in a set of reference samples, the Euclidean distance between similarity matrixes of two vectors of the character string is calculated and the preset threshold n is set in advance (for example, n=0.7). If the Euclidean distance is greater than the preset threshold n, it may be considered that, regarding to the character string, the difference between the two sample sets is great. Therefore, the character string (the important word) is a feature word. If a character string exists in the set of reference samples rather than in the set of malicious samples, the character string is discarded. If the character string exists in the set of malicious samples rather than in the set of reference samples, it is determined that the character string is the feature word and the Euclidean distance is set to be 1.

At block S104, the character strings in the preset range are extracted from the key character strings according to the malicious sample feature vectors and the character strings in the preset range are trained using the word2vec principle again to obtain second trained result.

The character strings in the preset range (the first trained result) are extracted from the key character strings of the multiple malicious samples according to the malicious sample feature vectors, and are trained using the word2vec principle again to obtain the second trained result, in which, the feature extraction is performed on the key character strings.

In an example, the preset range refers to the above preset Euclidean distance threshold.

At block S105, the malicious code rule is acquired based on the second trained result.

By acquiring the character strings having close relevance with the key character string, character string features of the character strings having close correlations with the key character string are found. The malicious code rule is acquired according to the character string features. For a character string having close relevance with the key character string, the Euclidean distance between a vector of the character string having close relevance with the key character string and the sample vector is shorter than the Euclidean distances between the vector of the character string having close relevance with the key character string and other n−1 sample vectors. By acquiring the (multiple) character strings having close relevance with a certain malicious sample, and finding the character string features of these character strings having close relevance with the key character string, the character string rule of the malicious codes is finally acquired according to the character string features.

As an example, according to the character string features of the character stings having close relevance with the key character strings, the character string rule of the malicious codes is extracted from the dex file in a manual extraction manner. For example, taking the key character strings illustrated in FIG. 2 as an example, these key character strings are trained using the word2vec principle to obtain the first trained result. The malicious sample feature vectors are constructed according to the first trained result. According to the malicious sample feature vectors, the character strings in the preset range are extracted from the key character strings. The character strings in the preset range are trained again using the word2vec principle to obtain the second trained result. On the basis of the second trained result, the character string rule of the malicious codes is acquired in a manual extraction manner. For example, the acquired rule is: *52.71.240.169* OR *52.71.240.168* OR *52.71.240.169* OR *abc_btn_radio*, in which "*" represents a fuzzy matching. It can be understood that the rule "*52.71.240.169*" means that all character strings including "52.71.240.169" are considered as the character strings with malicious codes.

In conclusion, in embodiments of the present disclosure, the dex file carring the malicious codes is first parsed into character strings. The key character strings are extracted from the character strings parsed from the dex file according to the preset rule. Then, the key character strings are trained using the word2vec principle so as to represent the key character strings with vectors. The vectors of the key character strings are used as the malicious sample attribution data. On the basis of the malicious sample attribution data and the white sample attribution data, n malicious sample attribution data and n standard sample attribution data are concluded. Vectors of the n malicious sample attribution data and vectors of the n standard sample attribution data are calculated based on the n malicious sample attribution data and n standard sample attribution data. Similarity matrixes for the malicious sample attribution data and for the standard sample attribution data are acquired. Main vectors are kept and respective dimension components of the main vectors are added up. The malicious sample feature vectors are therefore constructed. That is, the malicious sample feature vectors are the vectors of the attribution data having the great difference. The character strings in the preset range are extracted from the key character stings according to the malicious sample feature vectors. Then, the character strings in the preset range are trained using the word2vec principle again to obtain the second trained result (i.e., to obtain the susceptible character strings). On the basis of these susceptible character strings, the character string rule of malicious codes is extracted from the dex file according to a rule extraction manner. It may be understood that, the method for extracting the malicious code rule from the dex file may be applied to the field of malicious code detection and analysis.

Figure 3:
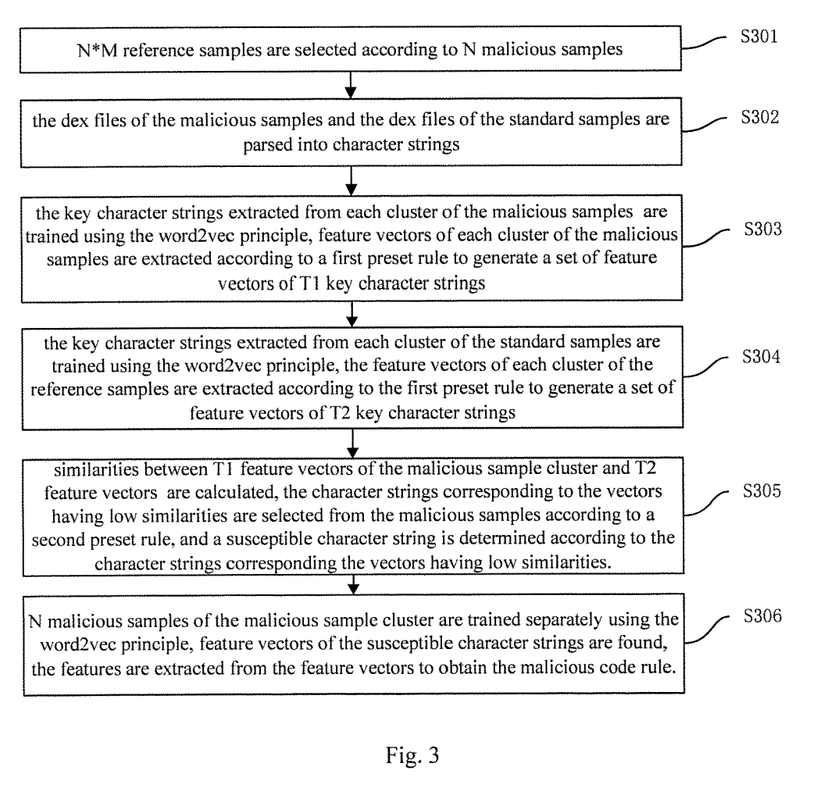
FIG. 3 is a flow chart illustrating a method for inferring a malicious code rule based on a deep learning method according to a specific embodiment of the present disclosure.

FIG. 3 is a flow chart illustrating a method for inferring a malicious code rule based on a deep learning method provided in a specific embodiment of the present disclosure. Assuming that there are N dex files carrying the malicious codes, which are called as malicious samples. It may be understood that, each of the malicious samples has corresponding reference samples. The reference sample is a normal sample issued officially and with no malicious codes.

As illustrated in FIG. 3, the method for inferring a malicious code rule based on a deep learning method may include followings.

At block S301, N*M reference samples are selected according to N malicious samples. N and M are both integers greater than 0.

As an example, the reference samples may be selected by using a principle of Monte Carle sampling.

At block S302, the dex files of the malicious samples and the dex files of the reference samples are parsed into character strings. Taking N samples as one unit, there are M+1 clusters of samples. For each cluster of samples, the function invoking relation, the code structure context or other contents describing relations of character strings in each sample (i.e. the key character strings of the malicious samples and the key character strings of the standard samples) are extracted from each sample.

At block S303, the function invoking relations and the code structure contexts of respective clusters of the malicious samples (that is, the key character strings of the malicious samples) are trained using the word2vec principle. Feature vectors of the respective clusters of malicious samples are extracted according to a first preset rule to generate a set of T1 feature vectors (the number of dimensions of each feature vector is limited within 20) of key character strings (generally T1 is greater than 10000) of malicious sample cluster. That is to say, the entire clusters of malicious samples are trained to obtain T1 feature vectors of character strings.

At block S304, the function invoking relations and the code structure contexts of respective clusters of the reference samples (i.e., the key character strings of the reference samples) are trained using the word2vec principle. The feature vectors of each sample are extracted according to the first preset rule to generate a set of T2 (T2 is not necessary equal to T1 since structures of reference samples are different, and T2 for each of M clusters are different from each other) feature vectors of character strings of the reference sample cluster (M clusters in total). The entire clusters of reference samples are trained. In other words, for M clusters, the training is performed for M times in total. Trained results are combined to obtain the T2 feature vectors of character strings.

Preferably, the feature vectors of same character strings included in M clusters of reference samples are averaged to obtain an average feature vector as a representation of the feature vectors of the reference samples.

At block S305, similarities between T1 feature vectors of the malicious sample cluster and T2 feature vectors of the reference sample cluster are calculated respectively. The character strings corresponding to the vectors having low similarities between the malicious sample cluster and the reference sample cluster are selected from the malicious sample cluster according to a second preset rule. If a difference between the character string of the malicious sample and that of the reference sample is large, it may be determined that the character string having the low similarity is a susceptible character string. The malicious code rule is extracted from the susceptible character strings.

A method for calculating the similarity includes, but not limited to, calculating a Euclidean distance or a Manhattan distance.

In addition, as there are M clusters of reference samples, weights may be set for the M clusters of reference samples respectively to calculate the similarities. The similarities are added up to obtain the similarity of each feature vector of the reference sample cluster.

As an example, judging whether the similarity is low may be achieved by setting a preset threshold. For example, the preset threshold may be determined in advance, by computing the Euclidean distance, if the similarity between the feature vector of the malicious sample cluster and the feature vector of the reference sample cluster is smaller than the preset threshold, it is determined that the similarity of the feature vector is low.

Hereto, blocks S301 to S305 mainly completes extracting the susceptible character strings from the N malicious samples.

The malicious code rule is extracted from the susceptible character strings in the following.

At block S306, N malicious samples belonging to the malicious sample cluster are trained separately using the word2vec principle (i.e., each malicious sample is trained separately). The trained character strings are filtered to select the character strings satisfying a condition described in the above block S305. That is to say, the feature vectors of the selected character strings satisfying the condition described in the above block S305 (i.e. the features vectors of the susceptible character strings) are found. The feature extraction is performed on the feature vectors to extract features of the feature vectors to obtain the malicious code rule.

As an example, a detailed process for performing the feature extraction on the feature vectors is described as follows. The feature vectors may be considered as a normal document, the features are extracted by using a LDA (Latent Dirichlet Allocation, a document title generation model, also called as a three-layer Bayesian probability model) method.

Figure 4:
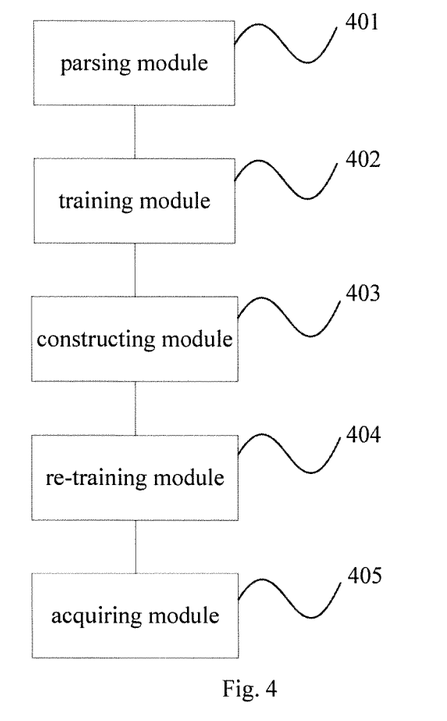
FIG. 4 is block diagram illustrating a system for inferring a malicious code rule based on a deep learning method provided in embodiments of the present disclosure.

Corresponding to the method for inferring a malicious code rule based on a deep learning method provided in embodiments above, a system for inferring a malicious code rule based on a deep learning method is also provided in embodiments of the present disclosure. Since the system corresponds to the method, implementations of the method described above are also suitable to the system provided in embodiments of the present, which are not elaborated herein. FIG. 4 is a structure diagram illustrating a system for inferring a malicious code rule based on a deep learning method provided in embodiments of the present disclosure. As illustrated in FIG. 4, the system includes a parsing module 401, a training module 402, a constructing module 403, a re-training module 404 and an acquiring module 405.

The parsing module 401 is configured to parse a dex file carrying malicious codes into character stings, and extract key character stings from the character strings according to a preset rule. The key character strings include a function invoking relation and a content of code structure context for describing relations of content character strings of the dex file.

As an example, a process to extract the key character strings by the parsing module 401 is described as follows. The reference samples are selected by using a Monte Carlo method. An Euclidean distance between character string of the reference sample and the character string of the dex file carrying the malicious codes is calculated. The key character strings are extracted from the character strings of the dex file carrying the malicious codes according to the Euclidean distances and a preset Euclidean distance threshold.

The training module 402 is configured to train the key character strings using a word2vec principle to obtain first trained result. As an example, the training module 402 is configured to, for each key character string, extract features of the key character string and infer character strings having a close relevance with the key character string. The character strings having close relevance with the key character strings are interpretative character strings for interpreting the key character strings.

The constructing module 403 is configured to construct malicious sample feature vectors according to the first trained result. As an example, the constructing module 403 is configured to obtain n sample attribution data based on sample attribution data, to calculate vectors of attribution data based on the n sample attribution data, to calculate a similarity matrix of the two vectors of the same attribution data, to keep main vectors, and to add up respective dimension components of the main vectors.

As an example, when the constructing module 403 keeps the main vectors and adds up the respective dimension components of the main vectors, the constructing module 403 is configured to keep the two vectors when a difference between the vectors is greater than a preset threshold, and to determine the vectors kept as the malicious sample feature vectors, in which, with respect to the vectors kept, the respective dimension components of the same attribution data are added up.

The re-training module 404 is configured to extract character strings in a preset range from the key character strings according to the malicious sample feature vectors, and to train the character strings in the preset range using the word2vec principle again to obtain a second trained result.

The acquiring module 405 is configured to a character string rule of malicious codes according to the second trained result. As an example, the acquiring module 405 is configured to acquire character strings having close relevance with the key character strings, to find character string features between the character strings having close relevance with the key character strings, and to acquire the character string rule of malicious codes according to the character string features.

In detail, in an embodiment of the present disclosure, the acquiring module 405 is configured to extract the character string features by using a document title generating model LDA to acquire the character string rule of malicious codes.

In order to achieve above embodiments, a terminal device is further provided in embodiments of the present disclosure. The terminal device includes one or more processors, a memory, and one or more programs. When the one or more programs are executed by the one or more processors, the one or more processors are configured to execute following actions:

S101', parsing a dex file carrying malicious codes into character stings, and extracting key character stings from the character strings according to a preset rule;

S102', training the key character strings using a word2vec principle to obtain a first trained result;

S103', constructing malicious sample feature vectors according to the first trained result;

S104', extracting character strings in a preset range from the key character strings according to the malicious sample feature vectors, and training the character strings in the preset range using the word2vec principle again to obtain a second trained result; and S105', acquiring a character string rule of malicious codes according to the second trained result.

In order to achieve above embodiments, a storage medium is further provided in embodiments of the present disclosure. The storage medium is configured to store application programs. The application programs are configured to execute a method for inferring a malicious code rule based on a deep learning method according to above embodiments of the present disclosure.

In conclusion, embodiments of the present disclosure are related to the method for inferring a malicious code rule based on a deep learning method. The method is mainly based on the word2vec principle. A known character string carrying the malicious codes is trained twice using the deep learning method, such that character strings having close relevance with the character string carrying the malicious codes, and further the character string rule of the malicious codes is obtained and finally relations of the malicious samples are obtained. With the method according to embodiments of the present disclosure, by fully utilizing features of the malicious samples, the malicious code rule having a low false alarm rate and a high coverage rate may be inferred. Therefore, an existing virus detection engine is optimized, an efficiency of the malicious codes detection is increased and the method may be applied to a field of malicious code analysis.

Embodiments described above are intended to illustrate the technical solutions, which are not construed to limit the technical solutions. Without departing from the scope thereof, various modifications and partial changes made to the disclosure should only fall into the scope of the appended claims.

What is claimed is:

1. A method for inferring a malicious code rule based on a deep learning method, comprising:
   obtaining malicious samples and reference samples corresponding to the malicious samples, wherein the malicious samples are dex files carrying malicious codes, and the reference samples are files without malicious codes;
   parsing each malicious sample and each reference sample into character strings, and extracting key character strings from the character strings according to a preset rule, wherein the key character strings extracted from the malicious samples are used as attribution data of the malicious samples, and the key character strings extracted from the reference samples are used as attribution data of the reference samples;
   training the key character strings using a word2vec principle to obtain a first trained result including vectors of the attribution data of the malicious samples and vectors of the attribution data of the reference samples;
   comparing a difference between the vectors of the attribution data of the malicious samples and the vectors of the attribution data of the corresponding reference samples, keeping the vectors of the attribute data with a difference greater than a preset threshold, and summing respective dimensional components of the kept vectors of the attribution data, to construct malicious sample feature vectors;
   extracting character strings in a preset range from the key character strings according to the malicious sample feature vectors, and training the character strings in the preset range using the word2vec principle again to obtain a second trained result; and
   acquiring a character string rule of malicious codes according to the second trained result.

2. The method according to claim 1, wherein training the key character strings using the word2vec principle comprises:
   for each key character string, extracting features of the key character string, and inferring character strings having a close relevance with the key character string according to features, in which the character strings having a close relevance with the key character string are interpretative character strings for interpreting the key character string.

3. The method according to claim 1, wherein extracting key character strings from the character strings according to a preset rule comprises:
   calculating a distance between a character string in the reference sample and a corresponding character string in the malicious sample; and
   extracting the key character strings from the character strings of the malicious sample according to the distances and a preset distance threshold.

4. The method according to claim 1, wherein the key character strings comprise a function invoking relation and a content of code structure context for describing relations of content character strings of the dex file.

5. The method according to claim 1, wherein comparing a difference between the vectors of the attribution data of the malicious samples and the vectors of the attribution data of the corresponding reference samples, comprises:
   calculating a similarity matrix including similarities between the vectors of the attribution data of the malicious samples;
   calculating a similarity matrix including similarities between the vectors of the attribution data of the corresponding reference samples; and
   comparing a difference between the similarity matrix for the vectors of the attribution data of the malicious samples and the similarity matrix for the vectors of the attribution data of the reference samples.

6. The method according to claim 1, wherein acquiring the character string rule of malicious codes according to the second trained result comprises:
   acquiring the character strings having close relevance with the key character strings, finding character string features between the character strings having close relevance with the key character strings, and acquiring the character string rule of malicious codes according to the character string features.

7. The method according to claim 6, further comprising:
   extracting the character string features by using a document title generating model LDA to acquire the character string rule of malicious codes.

8. A system for inferring malicious code rule based on a deep learning method, comprising:
   one or more processors;
   a memory; and
   one or more programs stored in the memory, when the one or more programs are executed by the one or more processors, the one or more processors are configured:
   to obtain malicious samples and reference samples corresponding to the malicious samples, wherein the malicious samples are dex files carrying malicious codes, and the reference samples are files without malicious codes;
   to parse each malicious sample and each reference sample into character stings, and to extract key character stings from the character strings according to a preset rule, wherein the key character strings extracted from the malicious samples are used as attribution data of the malicious samples, and the key character strings extracted from the reference samples are used as attribution data of the reference samples;
   to train the key character strings using a word2vec principle to obtain a first trained result including vectors of the attribution data of the malicious samples and vectors of the attribution data of the reference samples;
   to compare a difference between the vectors of the attribution data of the malicious samples and the vectors of the attribution data of the corresponding reference samples, to keep the vectors of the attribute data with a difference greater than a preset threshold, and to sum respective dimensional components of the kept vectors of the attribution data, to construct malicious sample feature vectors;
   to extract character strings in a preset range from the key character strings according to the malicious sample feature vectors, and to train the character strings in the preset range using the word2vec principle again to obtain a second trained result; and
   to acquire a character string rule of malicious codes according to the second trained result.

9. The system according to claim 8, wherein when the one or more processors are configured to train the key character strings using a word2vec principle, the one or more processors are configured:

for each key character string, to extract features of the key character string, and to infer character strings having a close relevance with the key character string according to the features, in which the character strings having a close relevance with the key character string are interpretative character strings for interpreting the key character string.

10. The system according to claim 8, wherein when the one or more processors are configured to extract key character strings from the character strings according to a preset rule, the one or more processors are configured:

to calculate a distance between a character string in the reference sample and a corresponding character string in the malicious sample; and to extract the key character strings from the character strings of the malicious sample according to the distances and a preset distance threshold.

11. The system according to claim 8, wherein the key character strings comprise a function invoking relation and a content of code structure context for describing relations of content character strings of the dex file.

12. The system according to claim 8, wherein when the one or more processors are configured to compare a difference between the vectors of the attribution data of the malicious samples and the vectors of the attribution data of the corresponding reference samples, the one or more processors are configured:

to calculate similarity matrix including similarities between the vectors of the attribution data of the malicious samples;

to calculate similarity matrix including similarities between the vectors of the attribution data of the corresponding reference samples; and to compare a difference between the similarity matrix for the vectors of the attribution data of the malicious samples and the similarity matrix for the vectors of the attribution data of the reference samples.

13. The system according to claim 8, wherein when the one or more processors are configured to acquire a character string rule of malicious codes according to the second trained result, the one or more processors are configured:

to acquire character strings having close relevance with the key character strings, to find character string features between the character strings having close relevance with the key character strings, and to acquire the character string rule of malicious codes according to the character string features.

14. The system according to claim 13, wherein the one or more processors are further configured to extract the character string features by using a document title generating model LDA to acquire the character string rule of malicious codes.

15. A non-transitory storage medium, configured to store application programs, wherein the application programs are configured to execute a method for inferring a malicious code rule based on a deep learning method, comprising:

obtaining malicious samples and reference samples corresponding to the malicious samples, wherein the malicious samples are dex files carrying malicious codes, and the reference samples are files without malicious codes;

parsing each malicious sample and each reference sample into character stings, and extracting key character stings from the character strings according to a preset rule, wherein the key character strings extracted from the malicious samples are used as attribution data of the malicious samples, and the key character strings extracted from the reference samples are used as attribution data of the reference samples;

training the key character strings using a word2vec principle to obtain a first trained result including vectors of the attribution data of the malicious samples and vectors of the attribution data of the reference samples;

comparing a difference between the vectors of the attribution data of the malicious samples and the vectors of the attribution data of the corresponding reference samples, keeping the vectors of the attribute data with a difference greater than a preset threshold, and summing respective dimensional components of the kept vectors of the attribution data, to construct malicious sample feature vectors;

extracting character strings in a preset range from the key character strings according to the malicious sample feature vectors, and training the character strings in the preset range using the word2vec principle again to obtain a second trained result; and acquiring a character string rule of malicious codes according to the second trained result.

* * * * *